(12) United States Patent
Esenwein et al.

(10) Patent No.: US 8,698,362 B2
(45) Date of Patent: Apr. 15, 2014

(54) ELECTRIC POWER TOOL WITH AN ELECTRIC MOTOR

(75) Inventors: Florian Esenwein, Uhingen-Holzhausen (DE); Peter Wassermann, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 356 days.

(21) Appl. No.: 12/742,214

(22) PCT Filed: Oct. 10, 2008

(86) PCT No.: PCT/EP2008/063596
§ 371 (c)(1),
(2), (4) Date: May 10, 2010

(87) PCT Pub. No.: WO2009/059863
PCT Pub. Date: May 14, 2009

(65) Prior Publication Data
US 2010/0270877 A1 Oct. 28, 2010

(30) Foreign Application Priority Data
Nov. 8, 2007 (DE) .......... 10 2007 053 308

(51) Int. Cl.
| | |
|---|---|
| *H02K 7/14* | (2006.01) |
| *H02K 9/06* | (2006.01) |
| *H02K 1/20* | (2006.01) |
| *B24B 23/00* | (2006.01) |
| *B25F 5/00* | (2006.01) |

(52) U.S. Cl.
CPC .. *H02K 9/06* (2013.01); *H02K 1/20* (2013.01); *H02K 7/145* (2013.01); *B24B 23/00* (2013.01); *B25F 5/008* (2013.01)
USPC ............... 310/62; 310/50; 310/52; 310/58; 310/59; 310/60 R

(58) Field of Classification Search
CPC .......... H02K 9/06; H02K 1/20; H02K 7/145; B24B 23/028; B25F 5/008
USPC ............. 310/50, 52, 58, 59, 60 R, 61, 62, 63
See application file for complete search history.

(56) References Cited

U.S. PATENT DOCUMENTS

| | | | |
|---|---|---|---|
| 1,476,776 A | | 12/1923 | Stamm et al. |
| 2,155,082 A | * | 4/1939 | Decker ................... 173/217 |
| 2,273,626 A | * | 2/1942 | Connell .................. 74/810.1 |
| 2,729,758 A | * | 1/1956 | Knapp ..................... 310/59 |
| 2,776,385 A | * | 1/1957 | Modrey ................... 310/71 |
| 3,411,024 A | * | 11/1968 | Maffey, Jr. ................ 310/50 |

(Continued)

FOREIGN PATENT DOCUMENTS

| | | |
|---|---|---|
| DE | 42315504 A1 | 11/1993 |
| DE | 4238564 A1 | 5/1994 |

(Continued)

*Primary Examiner* — John K Kim
(74) *Attorney, Agent, or Firm* — Maginot, Moore & Beck

(57) ABSTRACT

The invention relates to an electric machine tool, particularly an angle grinder, having an electric motor that can be forcibly cooled by a cooling air flow. The electric motor includes an armature and a field iron package disposed concentrically to the armature which are disposed in a cooling air flow. The invention proposes that the armature and the field iron package be disposed in series in the cooling air flow.

28 Claims, 1 Drawing Sheet

(56) References Cited

U.S. PATENT DOCUMENTS

| | | | | |
|---|---|---|---|---|
| 3,980,909 A | * | 9/1976 | Klein | 310/50 |
| 4,142,120 A | * | 2/1979 | Hallerback | 310/59 |
| 5,063,319 A | * | 11/1991 | Mason et al. | 310/210 |
| 5,280,210 A | * | 1/1994 | Kress et al. | 310/158 |
| 5,401,145 A | * | 3/1995 | Bleger et al. | 417/369 |
| 6,320,286 B1 | * | 11/2001 | Ramarathnam | 310/50 |
| 6,543,549 B1 | | 4/2003 | Riedl et al. | |
| 6,909,207 B2 | * | 6/2005 | Ikeda et al. | 310/47 |
| 2004/0124721 A1 | | 7/2004 | Pfisterer et al. | |
| 2004/0263008 A1 | * | 12/2004 | Voigt et al. | 310/58 |
| 2006/0055254 A1 | | 3/2006 | Pellegrino | |
| 2006/0266538 A1 | | 11/2006 | Stierle et al. | |
| 2008/0150375 A1 | * | 6/2008 | Shima | 310/50 |
| 2010/0270877 A1 | * | 10/2010 | Esenwein et al. | 310/62 |

FOREIGN PATENT DOCUMENTS

| | | |
|---|---|---|
| DE | 19924552 A1 | 11/2000 |
| DE | 102006041122 A1 | 4/2007 |
| EP | 0569738 A1 | 11/1993 |
| EP | 1398865 A2 | 3/2004 |
| FR | 1187570 A | 9/1959 |
| GB | 1391957 A | 4/1975 |
| JP | 2002010575 A | 1/2002 |

* cited by examiner

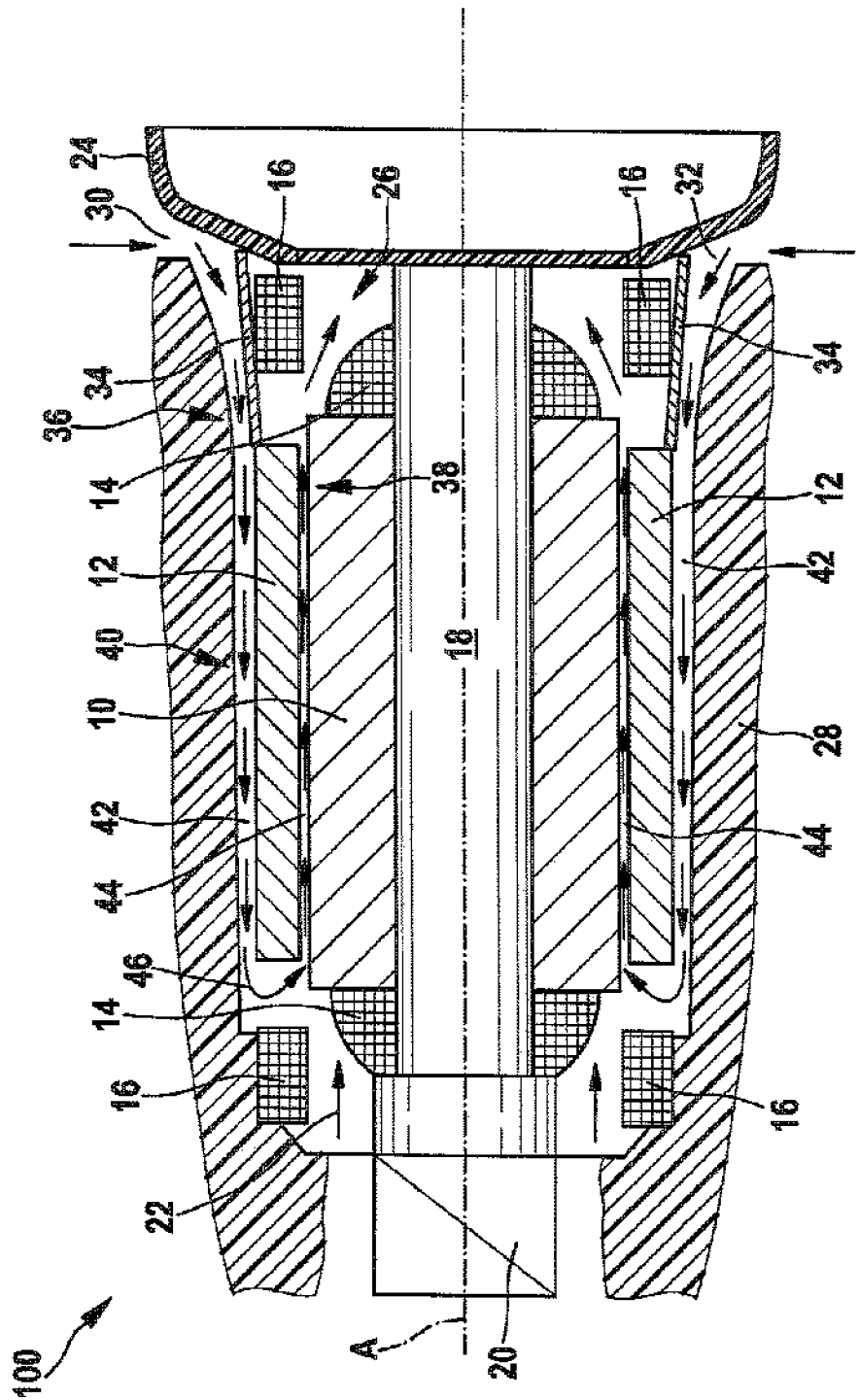

ELECTRIC POWER TOOL WITH AN ELECTRIC MOTOR

CROSS-REFERENCE TO RELATED APPLICATION

This application is a 35 USC 371 application of PCT/EP2008/063596 filed on Oct. 10, 2008.

BACKGROUND OF THE INVENTION

1. Field of Invention

The invention is based on an electric power tool having an electric motor.

2 Description of the Prior Art

In electric tools, air cooling is as a rule employed for cooling the electric motor. Via a fan or other device, an air flow is generated that flows among other places around the armature and the field iron of the electric motor. It is also already been proposed that certain parts of the electric tool, such as the winding head or the collector, be additionally cooled by means of additional flows or reverse flows.

From German Patent Disclosure DE 102 61 572 A1, it is for instance known for machine components that are located outside or in a low-flow region of the cooling air flow to be approached with a flow.

ADVANTAGES AND SUMMARY OF THE INVENTION

The invention is based on an electric power tool, in particular a right-angle sander, having an electric motor that is automatically coolable by a cooling air flow, and the electric motor has an armature and a field iron packet disposed concentrically to the armature, and the armature and the field iron packet are disposed in a cooling air flow.

It is proposed that the armature and the field iron packet are disposed in series in the cooling air flow. The fluidic series arrangement makes it possible to improve the cooling of the armature. The cooling of the electric motor is shifted in favor of the armature, and the cooling of the various components of the electric motor is better balanced. A critical temperature of the armature is reached only at relatively high loads, so that the rated output can be increased. The overload tolerance of the electric motor is improved as well. The improved cooling of the armature permits an increased power yield, for the same motor size, or a smaller motor size for the same power yield.

The more-effective and better-balanced cooling leads to overall improved cooling with at the same time a lesser total volumetric flow. This at the same time means more comfort and less noise (acoustical problems). Conversely, the possibility is attained of using a more-powerful fan and thus improving the cooling yet again, without increasing the previous noise level.

Preferably, the armature and the field iron packet can be disposed in a cooling conduit, in which a fluidic partition is provided between a first cooling conduit portion and a second cooling conduit portion. The partition may for instance be an air guide ring, which can advantageously extend from a suction region, for instance of a fan, to the field iron packet.

Advantageously, at a transition from the first to the second cooling conduit portion, a flow reversal between the first cooling conduit portion and the second cooling conduit portion can be provided.

The armature and a radially outer region, in terms of an axis of rotation of the armature, of the field iron packet can be approached by the cooling air flow in opposite directions.

In an advantageous refinement, the field iron packet can be disposed fluidically upstream of the armature. In this case, the field iron packet can be bathed with fresh, cool cooling air, and the entire cooling air flow has to flow through the motor interior, namely through the cooling conduit portion between the field iron packet and the armature. The cooling air flow in the motor interior can thus be increased markedly. As a result, especially effective cooling is imparted to the armature.

It is furthermore advantageous that the cooling air flow is to be encountered primarily in the region of the electric motor. In comparison to known modes of construction, the cooling air need not flow along electronic components, such as capacitors, switches, and the like, but instead must flow only in the vicinity of the electric motor. In the previous modes of construction, the metal powders entrained with the cooling air can in particular become deposited on the electronic components and lead to impairments in function, for instance by forming electrical bridges and the like. Alternatively, the armature can be disposed fluidically upstream of the field iron packet.

In a favorable refinement, the first cooling conduit portion can be provided between a device housing and the field iron packet, and the second cooling conduit portion can be disposed between the field iron packet and the armature. The field iron packet can function in a space-saving way as a further partition between the first and second cooling conduit portion.

Advantageously, a suction region for aspirating cooling air can be disposed on a downstream end of the second cooling conduit portion. Preferably, the suction region is disposed adjacent to the armature, for instance if a fan wheel is disposed on the armature shaft and brings about the aspiration of the cooling air flow.

The cooling air that flows through the first cooling conduit portion can preferably be aspirated through at least one cooling air inlet that can be disposed adjacent to an upstream end of the first cooling portion. A compact mode of construction is obtained if the first cooling portion is provided with at least one cooling air inlet adjacent to the armature.

Especially advantageously, the cooling air aspirated through the at least one cooling air inlet can be combined with a cooling air flow aspirated remotely from the at least one cooling air inlet and can be conducted through the second cooling conduit portion.

The invention is especially suitable for electric power tools with which abrasive work is done and in which powders laden in particular with metal particles can get into the cooling air flow.

BRIEF DESCRIPTION OF THE DRAWINGS

Further advantages will become apparent from the ensuing description of the drawing. In the drawing, one exemplary embodiment of the invention is shown. The drawing, description and claims include numerous characteristics in combination. One skilled in the art will expediently consider the characteristics individually as well and put them together to make useful further combinations.

The invention will be described below in conjunction with the accompanying drawings, in which:

FIG. 1 shows a partial outline of a portion of a preferred electric power tool, such as a preferred right-angle sander.

DESCRIPTION OF THE PREFERRED EMBODIMENT

The invention is based on an electric power tool, in particular a right-angle sander, having an electric motor that is automatically coolable by a cooling air flow, and the electric motor has an armature and a field iron packet disposed concentrically to the armature, and the armature and the field iron packet are disposed in a cooling air flow; it is proposed that the armature and the field iron packet are disposed in series in the cooling air flow.

For further explanation of the invention, the drawing shows a preferred electric power tool 100, having an electric motor that is disposed in a device housing 28 and can be automatically cooled by a cooling air flow. Besides other usual motor components, not shown, the electric motor has an armature 10 and a field iron packet 12, disposed concentrically to the armature 10, each with respective winding heads 14 and 16 disposed axially on the face end. The armature 10 is seated on a shaft 18 having an axis of rotation A. A fan wheel 24 is disposed on the shaft 18 and aspirates cooling air as soon as the shaft 18 rotates. On the side of the armature 10 opposite from the fan wheel 24, there is a collector 20 as well as other device components, not shown, that are familiar to one skilled in the art, such as electronics, gears, etc.

The armature 10 and the concentrically around the field iron packet 12 are disposed in a cooling air flow represented by arrows; first the field iron packet 12 is bathed with fresh cooling air, and then the armature 10 is bathed with the cooling air. The armature 10 and the field iron packet 12 are disposed in this respect in series in the cooling air flow; in the exemplary embodiment shown, the field iron packet 12 is disposed fluidically upstream of the armature 10.

The armature 10 and the field iron packet 12 are disposed in a cooling conduit 40 inside the device housing 28, in which a fluidic partition 34 is provided between a first cooling conduit portion 42 and a second cooling conduit portion 44. The partition 34 may for instance be embodied as an air guide ring, which extends from the fan wheel 24 to the face end of the field iron packet 12 oriented toward the fan wheel 24. The first cooling conduit portion 42 extends between the device housing 28 and the field iron packet 12; the second cooling conduit portion 44 extends between the field iron packet 12 and the armature 10.

A suction region 26 for aspirating cooling air is disposed on a downstream end 38 of the second cooling conduit portion 44, and the suction region 26 is located adjacent to the armature 10, at the level of the armature winding head 14. The cooling air, that flows through the first cooling conduit portion 42, is aspirated through at least one cooling air inlet 30, 32, which is disposed adjacent to an upstream end 36 of the first cooling portion 42, and this cooling air also flows along the armature 10 to the downstream end 38 of the second cooling conduit portion 44 as illustrated in FIG. 1.

At a transition 46 from the first cooling conduit portion 42 to the second cooling conduit portion 44, a flow reversal takes place between the first cooling conduit portion 42 and the second cooling conduit portion 44. The cooling air aspirated through the at least one cooling air inlet 30, 32 can be combined with a cooling air flow 22 disposed remotely from the at least one cooling air inlet 30, 32 and can be conducted through the second cooling conduit portion 44. The cooling air flow 22 is indicated by an arrow. The entire cooling air flow is thus forced through the second cooling conduit portion 44, and thus the armature 10 experiences a reliably high heat dissipation.

The foregoing relates to the preferred exemplary embodiment of the invention, it being understood that other variants and embodiments thereof are possible within the spirit and scope of the invention, the latter being defined by the appended claims.

The invention claimed is:

1. An electric power tool having an electric motor that is automatically cooled by a cooling air flow, and the electric motor has an armature and a field iron packet disposed concentrically to the armature, and the armature and the field iron packet are disposed in series in the cooling air flow,
    wherein the armature and the field iron packet are disposed in a cooling passageway, in which a fluidic partition is provided between a first cooling passageway portion and a second cooling passageway portion;
    wherein the cooling air that flows through the first cooling passageway portion is aspirated through a first cooling air inlet that is disposed adjacent to an upstream end of the first cooling passageway portion; and
    wherein a suction region for aspirating additional cooling air is disposed adjacent to the armature on a downstream end of the second cooling passageway portion and wherein the fluidic partition extends from the suction region to the field iron packet, wherein the fluidic partition is configured to separate the first cooling air inlet from the suction region such that the cooling air aspirated through the first cooling air inlet does not enter the suction region until after flowing through the first cooling passageway portion and the second cooling passageway portion.

2. The electric power tool as defined by claim 1, wherein at a transition from the first to the second cooling passageway portion, a flow reversal between the first cooling passageway portion and the second cooling passageway portion is provided.

3. The electric power tool as defined by claim 1, wherein the armature and a radially outer region of the field iron packet, referred to an axis of rotation of the armature, are approached by the cooling air flow in opposite directions.

4. The electric power tool as defined by claim 2, wherein the armature and a radially outer region of the field iron packet, referred to an axis of rotation of the armature, are approached by the cooling air flow in opposite directions.

5. The electric power tool as defined by claim 1, wherein the field iron packet is disposed in the cooling air flow fluidically upstream of the armature.

6. The electric power tool as defined by claim 4, wherein the field iron packet is disposed in the cooling air flow fluidically upstream of the armature.

7. The electric power tool as defined by claim 1, wherein the armature is disposed in the cooling air flow fluidically downstream of the field iron packet.

8. The electric power tool as defined by claim 2, wherein the armature is disposed in the cooling air flow fluidically downstream of the field iron packet.

9. The electric power tool as defined by claim 3, wherein the armature is disposed in the cooling air flow fluidically downstream of the field iron packet.

10. The electric power tool as defined by claim 1, wherein the first cooling passageway portion is provided between a device housing and the field iron packet, and the second cooling passageway portion is disposed between the field iron packet and the armature.

11. The electric power tool as defined by claim 2, wherein the first cooling passageway portion is provided between a device housing and the field iron packet, and the second cooling passageway portion is disposed between the field iron packet and the armature.

12. The electric power tool as defined by claim 6, wherein the first cooling passageway portion is provided between a device housing and the field iron packet, and the second cooling passageway portion is disposed between the field iron packet and the armature.

13. The electric power tool as defined claim 1, wherein the cooling air aspirated through the first cooling air inlet is combined with a cooling air flow aspirated through a second cooling air inlet which is positioned remotely from the first cooling air inlet and the cooling air aspirated from both cooling air inlets is conducted through the second cooling passageway portion.

14. An electric power tool having an electric motor that is automatically cooled by a cooling air flow, and the electric motor has an armature and a field iron packet disposed concentrically to the armature, and the armature and the field iron packet are disposed in series in the cooling air flow,
wherein the armature and the field iron packet are disposed in a cooling passageway, in which a fluidic partition is provided between a first cooling passageway portion and a second cooling passageway portion;
wherein the cooling air that flows through the first cooling passageway portion is aspirated through a first cooling air inlet that is disposed adjacent to an upstream end of the first cooling passageway portion;
wherein the cooling air aspirated through the first cooling air inlet is combined with a cooling air flow aspirated through a second cooling air inlet which is positioned remotely from the first cooling air inlet and the cooling air aspirated from both cooling air inlets is conducted through the second cooling passageway portion, and,
wherein a suction region for aspirating cooling air is disposed adjacent to the armature on a downstream end of the second cooling passageway portion and the fluidic partition extends from the suction region to the field iron packet.

15. The electric power tool as defined by claim 14, wherein at a transition from the first to the second cooling passageway portion, a flow reversal between the first cooling passageway portion and the second cooling passageway portion is provided.

16. The electric power tool as defined by claim 14, wherein the armature and a radially outer region of the field iron packet, referred to an axis of rotation of the armature, are approached by the cooling air flow in opposite directions.

17. The electric power tool as defined by claim 15, wherein the armature and a radially outer region of the field iron packet, referred to an axis of rotation of the armature, are approached by the cooling air flow in opposite directions.

18. The electric power tool as defined by claim 14, wherein the field iron packet is disposed in the cooling air flow fluidically upstream of the armature.

19. The electric power tool as defined by claim 17, wherein the field iron packet is disposed in the cooling air flow fluidically upstream of the armature.

20. The electric power tool as defined by claim 14, wherein the armature is disposed in the cooling air flow fluidically downstream of the field iron packet.

21. The electric power tool as defined by claim 15, wherein the armature is disposed in the cooling air flow fluidically downstream of the field iron packet.

22. The electric power tool as defined by claim 16, wherein the armature is disposed in the cooling air flow fluidically downstream of the field iron packet.

23. The electric power tool as defined by claim 14, wherein the first cooling passageway portion is provided between a device housing and the field iron packet, and the second cooling passageway portion is disposed between the field iron packet and the armature.

24. The electric power tool as defined by claim 15, wherein the first cooling passageway portion is provided between a device housing and the field iron packet, and the second cooling passageway portion is disposed between the field iron packet and the armature.

25. The electric power tool as defined by claim 19, wherein the first cooling passageway portion is provided between a device housing and the field iron packet, and the second cooling passageway portion is disposed between the field iron packet and the armature.

26. The electric power tool as defined by claim 25, wherein the cooling air that flows through the first cooling passageway portion is aspirated through a first cooling air inlet that is disposed adjacent to an upstream end of the first cooling portion adjacent to the armature.

27. The electric power tool as defined by claim 14, wherein the fluidic partition comprises an air guide ring.

28. An electric power tool having an electric motor that is automatically cooled by a cooling air flow, and the electric motor has an armature and a field iron packet disposed concentrically to the armature, and the armature and the field iron packet are disposed in series in the cooling air flow,
wherein the armature and the field iron packet are disposed in a cooling passageway, in which a fluidic partition is provided between a first cooling passageway portion and a second cooling passageway portion;
wherein the cooling air that flows through the first cooling passageway portion is aspirated through a first cooling air inlet that is disposed adjacent to an upstream end of the first cooling passageway portion;
wherein a suction region for aspirating additional cooling air is disposed adjacent to the armature on a downstream end of the second cooling passageway portion and wherein the fluidic partition extends from the suction region to the field iron packet; and
wherein the fluidic partition comprises an air guide ring.

* * * * *